United States Patent
Yudell et al.

(10) Patent No.: US 11,543,006 B2
(45) Date of Patent: Jan. 3, 2023

(54) VARIABLE TORQUE LIMITING CLUTCH FOR A STEEL BELT CONTINUOUSLY VARIABLE TRANSMISSION

(71) Applicant: TEAM Industries, Inc., Bagley, MN (US)

(72) Inventors: Alexander C. Yudell, Bemidji, MN (US); Bruce H. Younggren, Bemidji, MN (US); Jordan E. Fisk, Bemidji, MN (US)

(73) Assignee: TEAM Industries, Inc., Bagley, MN (US)

( * ) Notice: Subject to any disclaimer, the term of this patent is extended or adjusted under 35 U.S.C. 154(b) by 234 days.

(21) Appl. No.: 16/906,464

(22) Filed: Jun. 19, 2020

(65) Prior Publication Data

US 2020/0400222 A1 Dec. 24, 2020

Related U.S. Application Data

(60) Provisional application No. 62/865,034, filed on Jun. 21, 2019.

(51) Int. Cl.
*F16H 9/18* (2006.01)
*F16H 55/56* (2006.01)
(Continued)

(52) U.S. Cl.
CPC ............ *F16H 9/18* (2013.01); *F16D 25/0638* (2013.01); *F16D 25/14* (2013.01); *F16H 55/56* (2013.01)

(58) Field of Classification Search
CPC ......... F16H 9/18; F16D 25/0638; F16D 25/14
See application file for complete search history.

(56) References Cited

U.S. PATENT DOCUMENTS

| 4,094,203 A | 6/1978 | van Deursen et al. |
| 4,475,416 A | 10/1984 | Underwood |

(Continued)

FOREIGN PATENT DOCUMENTS

| CA | 2456633 A1 | 7/2004 |
| EP | 0063786 A1 | 11/1982 |

(Continued)

OTHER PUBLICATIONS

U.S. Patent and Trademark Office, "Notice of Allowance", U.S. Appl. No. 16/796,488, dated Mar. 11, 2022, pp. 1 through 9, Published: US.

(Continued)

*Primary Examiner* — Stacey A Fluhart
(74) *Attorney, Agent, or Firm* — Fogg & Powers LLC

(57) ABSTRACT

A driven sheave and variable torque limiting clutch assembly for a CVT that includes a drive sheave, a driven sheave, a VTL clutch and a hydraulic system is provided. The driven sheave is operationally coupled to a drive sheave via belt of the CVT. The driven sheave includes a fixed sheave member and a movable sheave member. The driven sheave is operationally coupled to a drivetrain. The VTL clutch is coupled between the driven sheave and the drivetrain to selectively couple torque between the driven sheave and the drivetrain. The hydraulic system is configured to manipulate both the movable sheave member of the driven sheave and the VTL clutch with shared hydraulic pressure.

19 Claims, 8 Drawing Sheets

(51) Int. Cl.
*F16D 25/0638* (2006.01)
*F16D 48/02* (2006.01)

(56) References Cited

U.S. PATENT DOCUMENTS

| | | | |
|---|---|---|---|
| 4,583,423 | A | 4/1986 | Hahne |
| 4,699,259 | A | 10/1987 | McColl |
| 4,716,791 | A | 1/1988 | Ohzono et al. |
| 4,881,925 | A | 11/1989 | Hattori |
| 5,176,579 | A | 1/1993 | Ohsono et al. |
| 5,470,285 | A | 11/1995 | Schneider et al. |
| 5,568,853 | A | 10/1996 | Adriaenssens |
| 5,667,448 | A | 9/1997 | Friedmann |
| 5,690,576 | A | 11/1997 | Moroto et al. |
| 5,931,756 | A | 8/1999 | Ohsono et al. |
| 6,155,396 | A | 12/2000 | Tsubata et al. |
| 6,332,856 | B1 | 12/2001 | Iwamoto |
| 6,623,388 | B1 | 9/2003 | Senger et al. |
| 6,679,796 | B2 | 1/2004 | Sugano |
| 6,716,129 | B2 | 4/2004 | Bott et al. |
| 7,410,042 | B2 | 8/2008 | Ochab et al. |
| 8,002,653 | B2 | 8/2011 | Shiozaki et al. |
| 8,075,432 | B2 | 12/2011 | Oishi et al. |
| 8,147,370 | B2 | 4/2012 | Nakajima et al. |
| 8,298,119 | B2 | 10/2012 | Jozaki et al. |
| 9,371,896 | B2 | 6/2016 | Kobayashi et al. |
| 9,546,719 | B2 | 1/2017 | Samie et al. |
| 9,689,440 | B2 | 6/2017 | Tsukuda et al. |
| 10,088,025 | B2 | 10/2018 | Yamada et al. |
| 10,240,667 | B2 | 3/2019 | Walter |
| 10,948,081 | B2 | 3/2021 | Rippelmeyer et al. |
| 2004/0033851 | A1 | 2/2004 | Lubben |
| 2004/0058760 | A1 | 3/2004 | Kuroda et al. |
| 2004/0077444 | A1 | 4/2004 | Kanda et al. |
| 2004/0171443 | A1 | 9/2004 | Borghi |
| 2007/0144283 | A1 | 6/2007 | Hasegawa et al. |
| 2008/0268992 | A1 | 10/2008 | Mitsubori et al. |
| 2010/0167853 | A1 | 7/2010 | Morita |
| 2015/0345570 | A1 * | 12/2015 | Tsukuda ............... B60W 10/107 192/3.63 |
| 2018/0252315 | A1 * | 9/2018 | Rippelmeyer .... F16H 61/66272 |
| 2019/0242473 | A1 * | 8/2019 | Hagihara ............... F16H 55/56 |
| 2020/0262292 | A1 | 8/2020 | Younggren et al. |
| 2020/0400221 | A1 | 12/2020 | Yudell et al. |
| 2021/0341039 | A1 * | 11/2021 | Kuroki ..................... F16H 9/18 |

FOREIGN PATENT DOCUMENTS

| | | | |
|---|---|---|---|
| EP | 184676 A * | 6/1986 | ............ F16D 25/14 |
| EP | 0787927 A2 | 8/1997 | |
| EP | 2275706 A1 | 1/2011 | |

OTHER PUBLICATIONS

U.S. Patent and Trademark Office, "Office Action", U.S. Appl. No. 16/796,488, dated Oct. 1, 2021, pp. 1 through 39, Published: US.

International Bureau, "International Preliminary Report on Patentability from PCT Application No. PCT/US2020/019068", from Foreign Counterpart to U.S. Appl. No. 16/796,488, dated Sep. 2, 2021, pp. 1 through 10, Published: WO.

International Searching Authority, "International Search Report and Written Opinion from PCT Application No. PCT/US2020/019068", from Foreign Counterpart to U.S. Appl. No. 16/796,488, dated Apr. 20, 2020, pp. 1 through 13, Published: WO.

U.S. Patent and Trademark Office, "Final Office Action", U.S. Appl. No. 16/796,488, dated Jan. 31, 2022, pp. 1 through 11, Published: US.

U.S. Patent and Trademark Office, "Notice of Allowance", U.S. Appl. No. 16/906,452, dated Jul. 29, 2022, pp. 1 through 37, Published: US.

* cited by examiner

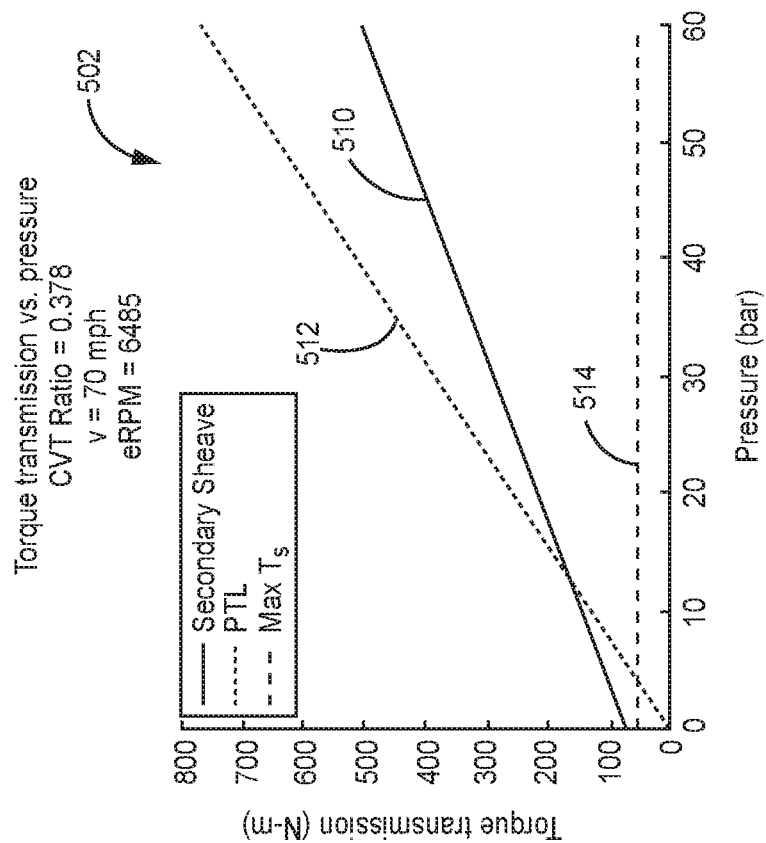
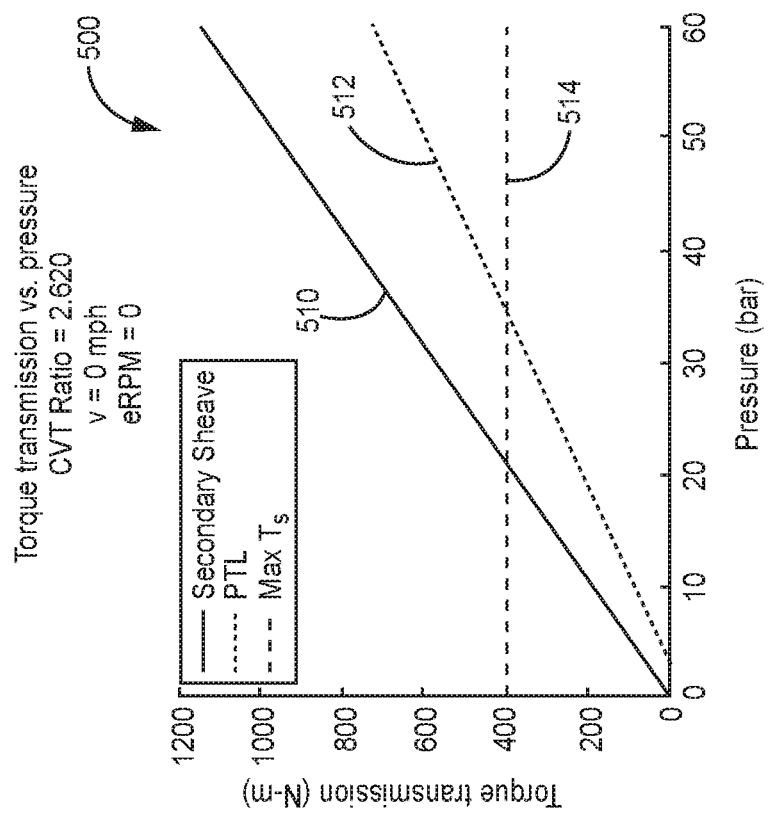
FIG. 5A
FIG. 5B ered the VARIABLE TORQUE LIMITING CLUTCH
FOR A STEEL BELT CONTINUOUSLY
VARIABLE TRANSMISSION

CROSS-REFERENCE TO RELATED
APPLICATIONS

This Application claims priority to U.S. Provisional Application Ser. No. 62/865,034, same title herewith, filed on Jun. 21, 2019, which is incorporated in its entirety herein by reference.

BACKGROUND

A typical continuously variable transmission (CVT) includes a drive or primary sheave that is rotationally coupled to a motor and driven or secondary sheave that is rotationally coupled to a drive train. The drive and driven sheaves are rotationally coupled to each other with the use of a belt. Steel belt CVTs are capable of delivering a wide gear ratio range from a single device. This enables the engine to operate at peak efficiency or peak power at a wide range of vehicle speeds. However, it also means that the torque, that must be transmitted by the driven sheave of a CVT, can range from a multiplier less than the peak engine torque to a multiplier greater than the peak engine torque. Moveable sheave members on the drive and driven sheave may be controlled with hydraulic pressure. The hydraulic clamp load and the running radius of the belt determine the maximum torque that can be transmitted to the driven sheave before major slip occurs at the belt/sheave interface. This type of slip can be damaging to the steel belt CVT (SBCVT) and should be prevented.

SBCVT's are currently employed by the auto industry in passenger car applications. In these applications, torque spikes coming from the wheels are typically of low magnitude. The automotive industry is able to prevent slip due to these spikes by over-clamping at the drive and driven sheaves, thus allowing the sheaves to transmit the torque spikes without major slip.

In more strenuous applications, such as in trucks or off-road vehicles, torque spikes to the driveline from the wheels are more common. Torque spikes and reversals are caused by rough roads, rolling bumps and vehicle jumping activities. These spikes can be equal to several times the maximum wheel torque provided by the prime mover. Over-clamping to protect against spikes of this magnitude would lead to unacceptable drivetrain inefficiency due to friction losses between the sheaves and the belt.

SUMMARY

The following summary is made by way of example and not by way of limitation. It is merely provided to aid the reader in understanding some of the aspects of the subject matter described. Embodiments provide an adjustable clutch that is connected in series with a driven sheave, on a drivetrain side toward the wheels of a vehicle.

In one example embodiment, a driven sheave and variable torque limiting (VTL) clutch assembly for a CVT that includes a drive sheave, a driven sheave, a VTL clutch and a hydraulic system is provided. The driven sheave is operationally coupled to a drive sheave via belt of the CVT. The driven sheave includes a fixed sheave member and a movable sheave member. The driven sheave is operationally coupled to a drivetrain. The VTL clutch is coupled between the driven sheave and the drivetrain to selectively couple torque between the driven sheave and the drivetrain. The hydraulic system is configured to manipulate both the movable sheave member of the driven sheave and the VTL clutch with shared hydraulic pressure.

In another example, a driven sheave and variable torque limiting clutch assembly for a CVT that includes a driven sheave, a VTL clutch and a hydraulic system is provided. The driven sheave is configured to be operationally coupled to a drive sheave via belt. The driven sheave includes a fixed sheave member and a movable sheave member. The driven sheave is operationally coupled to a drivetrain. The VTL clutch is coupled between the driven sheave and a drivetrain to selectively couple torque between the driven sheave and the drivetrain. The hydraulic system is configured to manipulate both the movable sheave member of the driven sheave and the VTL clutch. Further wherein one of the driven sheave and the VTL clutch includes at least one hydraulic passage that is in communication with at least one other hydraulic passage in the other one of the driven sheave and the VTL clutch.

In still another example, a vehicle including a variable torque limiting clutch for a CVT is provided. The vehicle includes a motor, a drivetrain, at least one sensor, a VTL clutch and a hydraulic system. The motor is configured to generate engine torque. The at least one sensor is used to generate sensor signals based on at least one operational perimeter of the vehicle. The CVT includes a drive sheave and a driven sheave. The drive sheave is operationally coupled to the motor. The drive sheave is further operationally coupled to the driven sheave by a belt. The driven sheave includes a fixed sheave member and a movable sheave member. The VTL clutch is coupled between the driven sheave and the drivetrain to selectively couple and uncouple torque between the driven sheave and the drivetrain. The hydraulic system is configured to manipulate both the movable sheave member of the driven sheave and the VTL clutch with shared hydraulic pressure.

BRIEF DESCRIPTION OF THE DRAWINGS

Embodiments can be more easily understood and further advantages and uses thereof will be more readily apparent, when considered in view of the detailed description and the following figures in which:

FIG. 5A illustrates a torque transmission vs. pressure plot with a CVT gear ratio of 2.620 for a driven sheave and variable torque limiting clutch assembly for a SBCVT according to one exemplary embodiment;

FIG. 5B illustrates a torque transmission vs. pressure plot with a CVT gear ratio of 0.378 for a driven sheave and variable torque limiting clutch assembly for a SBCVT according to one exemplary embodiment;

In accordance with common practice, the various described features are not drawn to scale but are drawn to emphasize specific features relevant to the subject matter described. Reference characters denote like elements throughout Figures and text.

DETAILED DESCRIPTION

Figure 1:
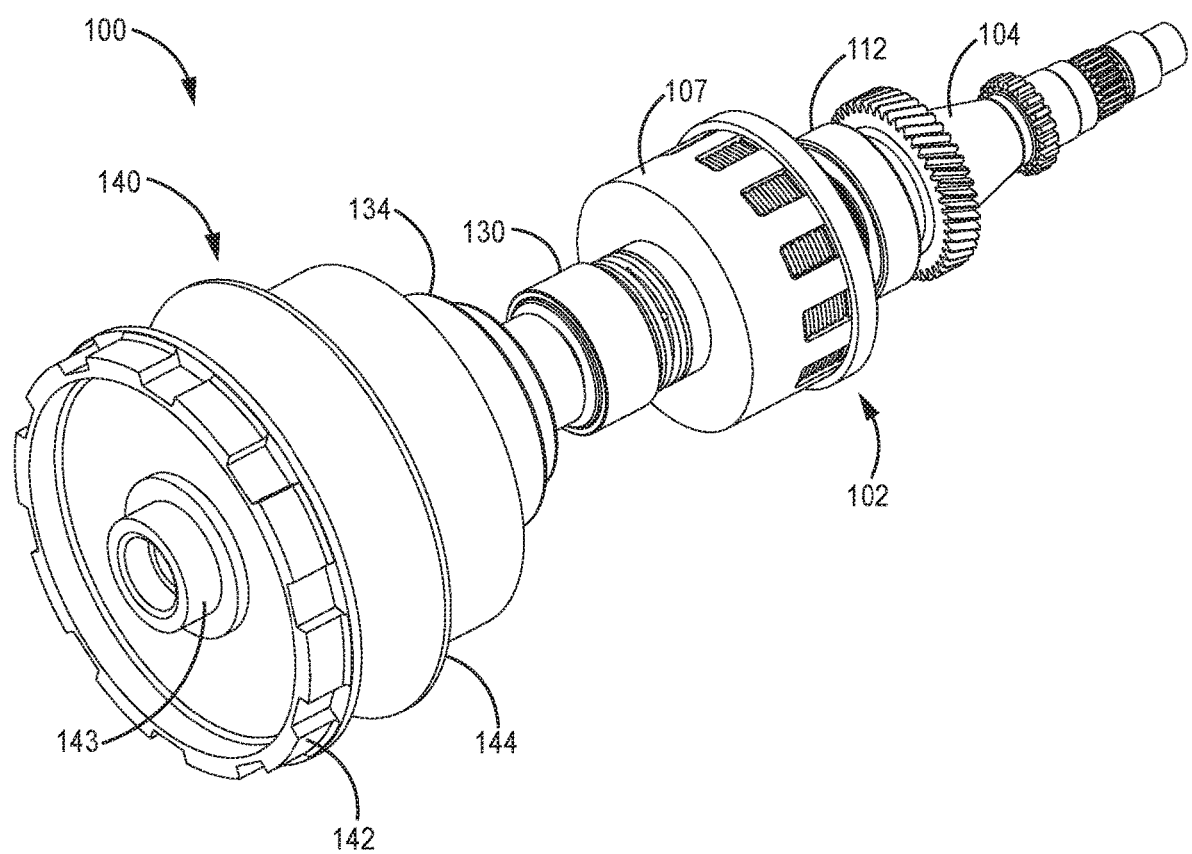
FIG. 1 illustrates a side perspective view of a driven sheave and variable torque limiting clutch assembly for a SBCVT according to one exemplary embodiment.

In the following detailed description, reference is made to the accompanying drawings, which form a part hereof, and in which is shown by way of illustration specific embodiments in which the inventions may be practiced. These embodiments are described in sufficient detail to enable those skilled in the art to practice the embodiments, and it is to be understood that other embodiments may be utilized and that changes may be made without departing from the spirit and scope of the present invention. The following detailed description is, therefore, not to be taken in a limiting sense, and the scope of the present invention is defined only by the claims and equivalents thereof.

Embodiments provide a variable torque limiting (VTL) clutch (or peak torque limiting clutch) that is connected in series with a driven sheave. The VTL clutch is located on a driveline (or driveline) side of the CVT toward the wheels of a vehicle.

As discussed above, strong torque spikes may cause damaging slip between the steel belt and the sheaves of a SBCVT. The torque spikes are generated when there is a sudden change in wheel speed due to rough roads or jumping the vehicle. The SBCVT can be protected from these spikes by placing a clutch with a breakaway torque less than the transmittable torque of the driven sheave between that driven sheave and the wheels. Embodiments utilize a VTL clutch that may be hydraulically connected to the driven sheave. In this configuration, the driven sheave pressure provides both the axial force required to transmit torque to the belt, as well as the thrust force required to clamp clutch plates of the VTL clutch as described below in detail.

Embodiments also create a VTL clutch with breakaway torque that tracks with the transmittable torque of the driven sheave. This allows the torque level to be held just below the torque transmittable by the driven sheave. Embodiments further provide a device that will protect the SBCVT from torque spikes without the need for heavy over-clamping of the CVT belt. Over clamping causes friction loss and associated heat generation. Embodiments also remove the need for a dedicated clutch hydraulic control valve and circuit by sharing pressure with the driven sheave with the ability to actuate the variable torque limiting clutch from the same hydraulic pressure as the driven sheave. The VTL clutch may be in hydraulic communication with the pressure chamber on driven sheave to reduce hydraulic complexity. The VTL clutch may also be actuated with its own hydraulic circuit, independent of driven sheave pressure in another embodiment. Further in another embodiment the VTL clutch may also be actuated from the drive sheave pressure.

Other embodiments may activate the VTL clutch by other systems including, but not restricted to, ball ramp, electronic solenoid, mechanical lever, throw cam or any other system of actuating a clutch. In an embodiment, the adjustable clutch is a multi-plate clutch. In other embodiments any clutching device could fill this purpose including, but not restricted to, a band clutch, a cone clutch or any other type of clutching device. Further in some embodiments, the VTL clutch may be set to always be capable of transmitting less torque than the driven sheave. This ensures that any slip that occurs between the wheels and the drive sheave will occur at the VTL clutch and not between the steel belt and sheave members.

Figure 2:
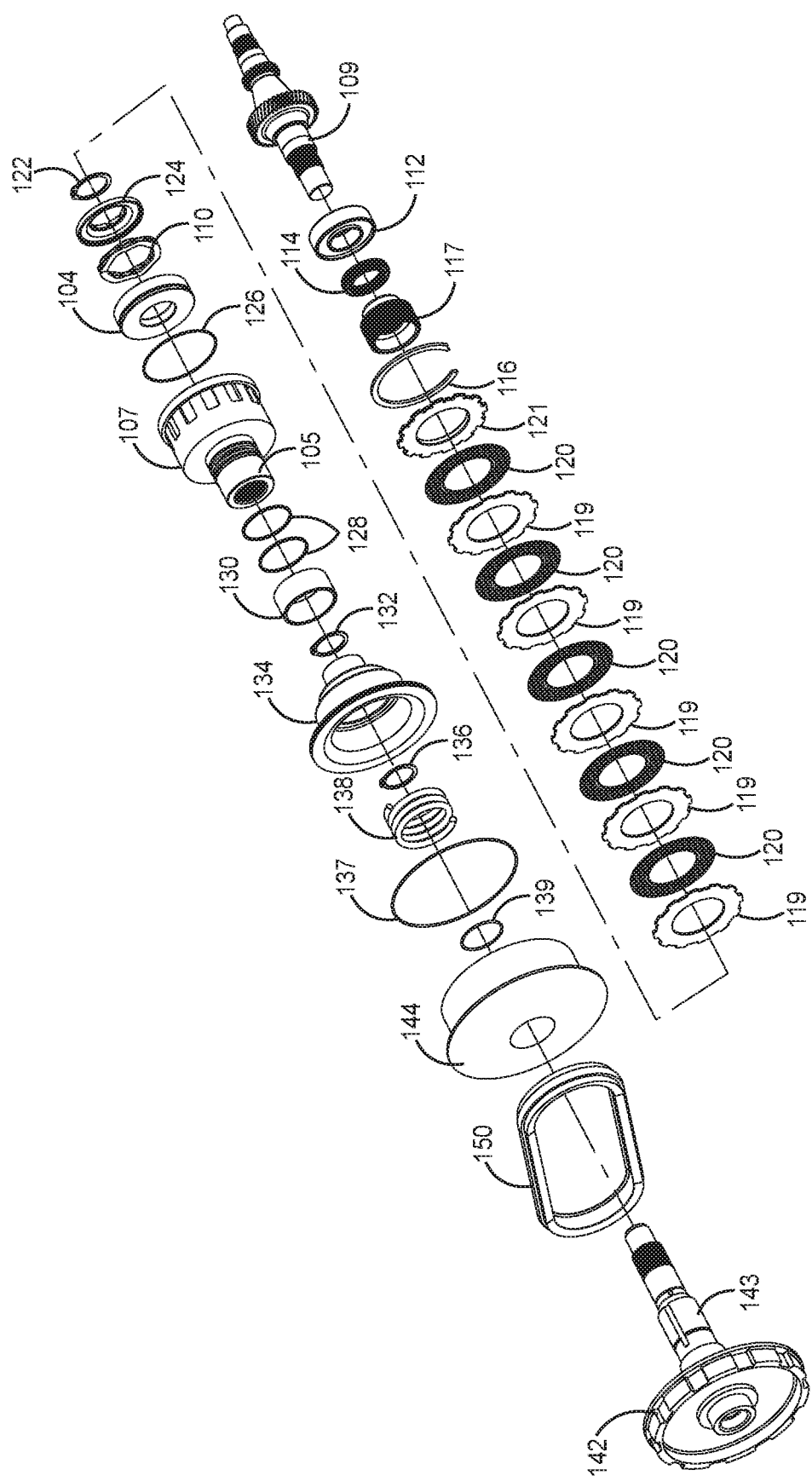
FIG. 2 is an unassembled view of the driven sheave and variable torque limiting clutch assembly for a SBCVT of FIG. 1.
Figure 3:
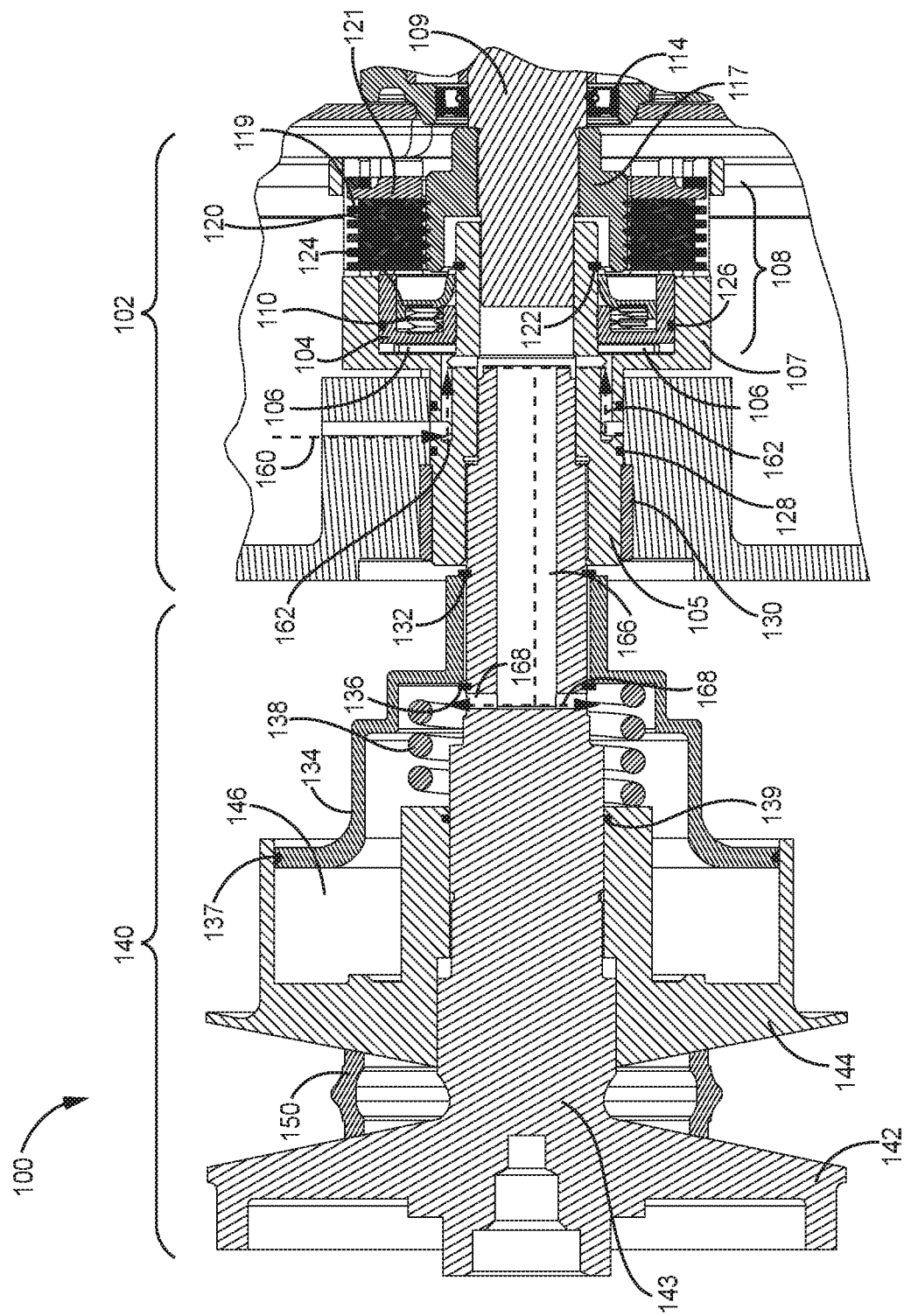
FIG. 3 illustrates a cross-sectional side view of the driven sheave and variable torque limiting clutch assembly for a SBCVT of FIG. 1.

FIG. 1 illustrates a side perspective view of a driven sheave and VTL clutch assembly 100 for a SBCVT of an embodiment. Further, FIG. 2 illustrates the driven sheave and VTL clutch assembly 100 unassembled and FIG. 3 illustrates a cross-sectional side view of the assembled VTL clutch and driven assembly 100. The driven sheave and VTL clutch assembly 100 in this embodiment includes a VTL clutch 102 and a driven sheave 140. The driven sheave 140 is part of a CVT, such as CVT 601 illustrated in FIG. 6, that would include a drive sheave 602 that would be operationally coupled to a motor 612. The driven sheave 140 is operationally coupled to a drivetrain 608 of a vehicle 600 that may include further gearing, drive shafts, differentials, half shafts, wheels, etc. The driven sheave 140 is further operationally coupled to the drive sheave with an endless loop member (belt 150) such as steel belt discussed in embodiments. The steel belt may be a push or pull type. The term "operationally coupled" generally means that a torque transferring interface is present between the components.

As best illustrated in FIGS. 2 and 3, the driven sheave 140 in this example, includes a fixed sheave member 142 that is coupled to, or includes, a driven post 143 and a movable sheave member 144. The movable sheave member 144 is slidably mounted on the driven post 143 and, in one embodiment, may be rotationally locked to the rotation of driven post 143 but allowed to selectively move axially on the driven post 143. A movable sheave chamber 146 (or hydraulic chamber) is formed between an inside surface of a hub portion of the movable sheave member 144 and a sheave stator 134. The sheave stator 134 is axially fixed on the driven post 143 via snap rings 136 and 132. A sliding sheave seal 137 provides a seal between an inner surface of the hub portion of the movable sheave member 144 and an end edge of the sheave stator 134. Further an O-ring 139 is positioned in a groove in an inside surface of the movable sheave member 144 to create a seal between the movable sheave member 144 and the driven post 143. In another embodiment, an O-ring is not used. In the embodiment without an O-ring, the hydraulic chamber 146 is sealed via small clearances between the moveable sheave member 144 and the driven post 143. The embodiment of FIG. 3 further includes a driven bias member 138 which is a spring is this example. The bias member 138 exerts a select bias force on the movable sheave member 144 towards the fixed sheave member 142. This provides a tight hold force on the belt 150 during low or no hydraulic pressure.

The VTL clutch 102 includes a clutch output shaft 109. Mounted on the clutch output shaft 109 are a clutch pack and a clutch basket 107. The clutch pack includes a plurality of alternating reaction and friction plates 119 and 120. The reaction plates 119 are statically engaged the clutch basket 107 while the friction plates 120 in this example are statically connected to clutch output shaft 109 via splined hub 117. The attachment of the friction and reaction plates 119 and 120 may be oppositely connected to the respective clutch basket 107 and the clutch output shaft 109 in another embodiment. The reaction and friction plates 119 and 120 may be generally referred to as clutch plates or a first set of clutch plates 119 and a second set of clutch plates 120. The clutch pack further includes a stack backing plate 121. A snap ring 116 received within a groove in an inside surface of a drum portion of the clutch basket 107 retains the stack backing plate 121 within the clutch basket 107.

The VTL clutch 102 further includes a clutch piston 104 that is received within the drum portion of the clutch basket 107. O-ring 126 is received within a groove in an outer perimeter of the clutch piston 104 to create a seal between the clutch piston 104 and the clutch basket 107. A clutch stator 124 is statically held in an axial position on a shaft portion 105 (or VTL clutch shaft 105) of the clutch basket via snap ring 122. The VTL clutch shaft 105 is configured to receive an end portion of the driven post 143. A clutch biasing member 110, such as a VTL spring in this example, is positioned between a surface of the clutch piston 104 and a surface of the clutch stator 124 to exert a bias force on the clutch piston away from the clutch plates. The VTL clutch 102 further includes a bushing 130 that is mounted on a surface of the shaft portion 105 of the clutch basket 107 and rotary seals 128 that are received in grooves in an outer surface of the shaft portion 105 of the clutch basket 107 to provide a rotating sealable interface. As discussed above, the clutch 102 includes the splined hub 117 (or clutch hub 117) that is configured to couple rotation between the friction plates 120 of the clutch pack and a VTL output shaft 109. A seal 114 and bearing 112 are mounted on the VTL output shaft 109 via the splined hub 117. Other configurations of the clutch basket/clutch pack arrangements of the VTL clutch may be used in other embodiments.

As discussed above, the moveable sheave 144 and the sheave stator 134 form a hydraulic chamber 146. In embodiments, hydraulic fluid provides selective pressure from within the hydraulic chamber 146 to selectively move the movable sheave 144 towards and away from the fixed sheave 142 and asserts a desired clamping force on steel belt 150. A higher asserted force, relative to a force in a drive sheave of a CVT, moves the belt 150 away from the driven post 143 on belt engaging surfaces of the respective fixed and moveable sheave members 142 and 144 and a lesser asserted force moves the belt 150 towards the driven post 143 on the belt engaging surfaces of the respective fixed and moveable sheave members 142 and 144. This movement changes the gear ratio provided by the driven sheave 140 of the SBCVT 601.

As also discussed above, the VTL clutch 102 includes the VTL clutch shaft 105 (or first clutch post) that is coupled to the driven post 143. The clutch hub 117 is coupled to the VTL output shaft 109 (or driveline post). The output shaft 109 is operationally coupled to the driveline components (drivetrain 608) of the vehicle. The clutch pack 108 selectively couples and uncouples torque between the VTL clutch shaft 105 and the clutch hub 117. The clutch piston 104 is used to activate the clutch pack 108. Hydraulic pressure introduced into a clutch hydraulic chamber 106 is in turn used to activate the clutch piston 104. The biasing member 110 may be used to bias the clutch piston 104 to not activate the clutch pack 108 when the hydraulic pressure is below a select pressure level. This feature allows the VTL clutch 102 to be used as a neutral disconnect. This is an important feature in that it allows the vehicle to be towed without causing damage to at least the CVT of the vehicle. When towing a vehicle, a variator of the vehicle must be disconnected at the wheels or damage will occur. Having a VTL clutch 102 with a bias member 110 as described, guarantees that the variator will be disconnected when the engine is stopped. Hence, embodiments do not require an operator of the vehicle to manually throw a lever to activate an electronic disconnect in a towing situation.

Embodiments use the same hydraulic system to manipulate both the clutch piston 104 of the VTL clutch 102 and the movable sheave member 144 of the driven sheave 140. Referring to FIG. 3, an illustration of the hydraulic pressure communication 160 is provided. In this example embodiment, the hydraulic pressure is provided through a VTL clutch shaft hydraulic passage 162 in the first clutch post 105 (VTL clutch shaft 105) to the clutch hydraulic chamber 106 of the VTL clutch 102. The pressure further flows into a post passage 166 of the driven post 143 and through the passages 168 of the driven post 143 to the hydraulic chamber 146 of the driven sheave 140.

Figure 4:
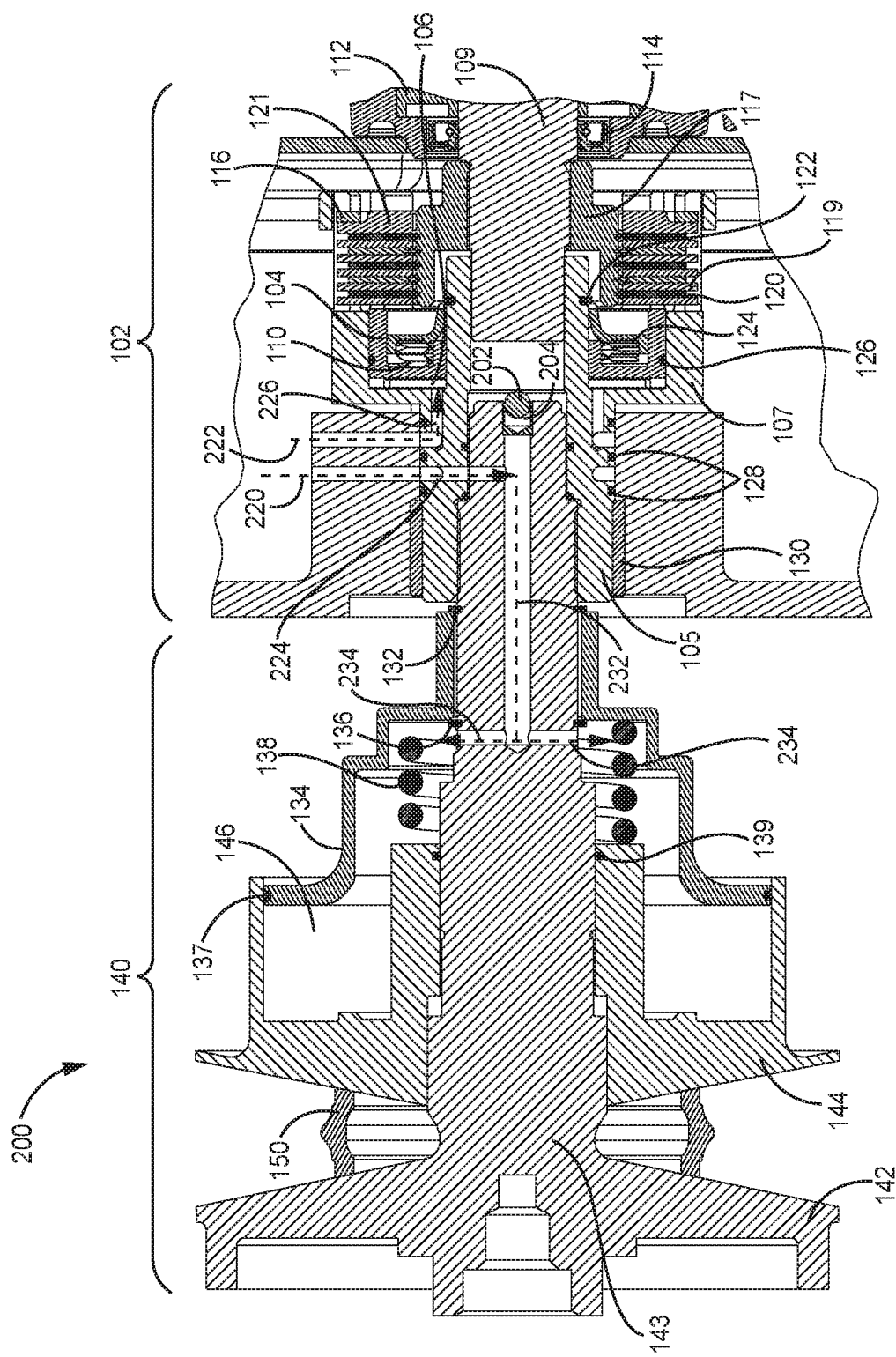
FIG. 4 illustrates a cross-sectional side view of a driven sheave and variable torque limiting clutch assembly for a SBCVT according to one exemplary embodiment.

FIG. 4 illustrates a cross-sectional side view of another driven sheave and VTL clutch assembly 200 for a SBCVT. In this example, the driven sheave 140 and VTL clutch 102 are not in hydraulic communication. In this example embodiment, different hydraulic pressure routing passages 220 and 222 are used. This allows for the activation of the VTL clutch 102 separately from the driven sheave 140. The separate hydraulic pressure passages 224 and 226 through the VTL clutch shaft 105 are used to separately provide hydraulic pressure to the piston 104 of the VTL clutch 102 and the moveable sheave member 114 of the driven sheave 140. As illustrated in this example, a separate hydraulic pressure path 222 through passage 226 in the VTL clutch shaft 105 leads to the clutch hydraulic chamber 106 to selectively activate the clutch piston 104 to exert pressure on the plates 120 and 119 of the clutch pack 108. Further, hydraulic pressure path 220 is illustrated as passing through passage 224 in the VTL clutch shaft 105 to passage 230 in the driven post 143. From passage 232 in the driven post 143 the hydraulic pressure path 220 flows through passages 234 in the driven post 143 to the hydraulic chamber 146 of the movable sheave member 144. The driven sheave and variable torque limiting clutch assembly 200 for a SBCVT further includes ball 202 and plug 204 assembly to retain the hydraulic fluid pressure within hydraulic pressure path 232

A number of factors are in play when considering the sizing of the piston area and number of clutch plates of the clutch pack 108, including CVT gear ratio range, maximum coefficient of friction between the belt and sheave, clutch plate coefficient of friction, and the driven sheave angular velocity from 0 vehicle speed to maximum vehicle speed (centrifugal pressure rise). The balancing of these considerations can be used to achieve a driven sheave and variable torque limiting clutch 200 for a SBCVT with desired operating characteristics.

In some embodiments, the torque limiting clutch plates and piston area of the VTL clutch 102 are selected such that the VTL clutch 102 transmits less torque than the belt to driven sheave interface at all CVT ratios and driving torque pressure levels. By dynamically changing the thrust force of the VTL clutch 102 with the hydraulic clamp load of the driven sheave 140, the breakaway torque of the VTL clutch 102 will track with the transmittable torque of the driven sheave 140. The maximum torque value that can pass through the VTL clutch 102 is the breakaway torque. If the VTL clutch 102 is located between the wheels and the driven sheave 140, then the most torque that the driven sheave 140 will be exposed to is equal to the breakaway torque value. However, this is not true if there is a gear ratio between the VTL clutch 102 and the driven sheave 140. Then it would be equal to the breakaway torque value times any gear ratio between the clutch 102 and the driven sheave 140. The breakaway torque value, or the torque seen at the driven sheave 140 (if there were a gear ratio between the VTL clutch 102 and the driven sheave 140), should be less than the torque transmittable by the driven sheave to ensure that slip induced by torque spikes will occur at the VTL clutch 102, and not the belt-sheave interface at the driven sheave member.

Referring to FIGS. 5A and 5B torque transmission vs. pressure plots 500 and 502 are provided for CVT gear ratios of 2.620 (representative maximum underdrive) and 0.378 (representative maximum overdrive) respectively. Plots 500 and 502 graph the torque transmission vs. pressure 510 for the driven sheave 140 and the torque transmission vs. pressure 512 for the VTL clutch 102 as well as a select max torque 514. The select max torque 514 is a maximum torque level that the engine can produce at the driven sheave given the CVT ratio. These plots 500 and 502 show that over the range of CVT ratios, the VTL clutch 102 can be sized such that the driven sheave 140 transfers more torque than the torque limiting clutch over the range of relevant pressures.

In the case of the overdrive plot (CVT gear ratio=0.378), the lines cross at a torque value of about 150 Nm. In full overdrive, the prime mover modeled can only produce 58 Nm at the driven sheave. Therefore, clamping above this value, and into the region where the lines have crossed, is unnecessary (these pressure levels are not relevant to any operating conditions).

In embodiments, the clutch plates, such as plates 119 and 120 of VTL clutch and driven sheave assembly 100 as well as the clutch plates driven sheave and variable torque limiting clutch 200, and the launch activation assembly, are selected such that the VTL 102 transmits less torque than the belt 150 to driven sheave interface engaging surfaces of the movable and stationary sheaves members 142 and 144. This ensures that slip occurs in the VTL 102, and not between the drive sheave 140 and belt 150. As discussed above, a number of factors are in play when considering the sizing of the piston area of the VTL 102 and number of clutch plates, including gear ratio, maximum coefficient of friction between the belt and sheave, clutch plate coefficient of friction, engine rpm at launch conditions (centrifugal pressure rise). In some embodiments, a balancing of the factors in a VTL clutch 102 are selected to achieve a lower torque transmission than the driven sheave 140 under all launch conditions.

Figure 6:
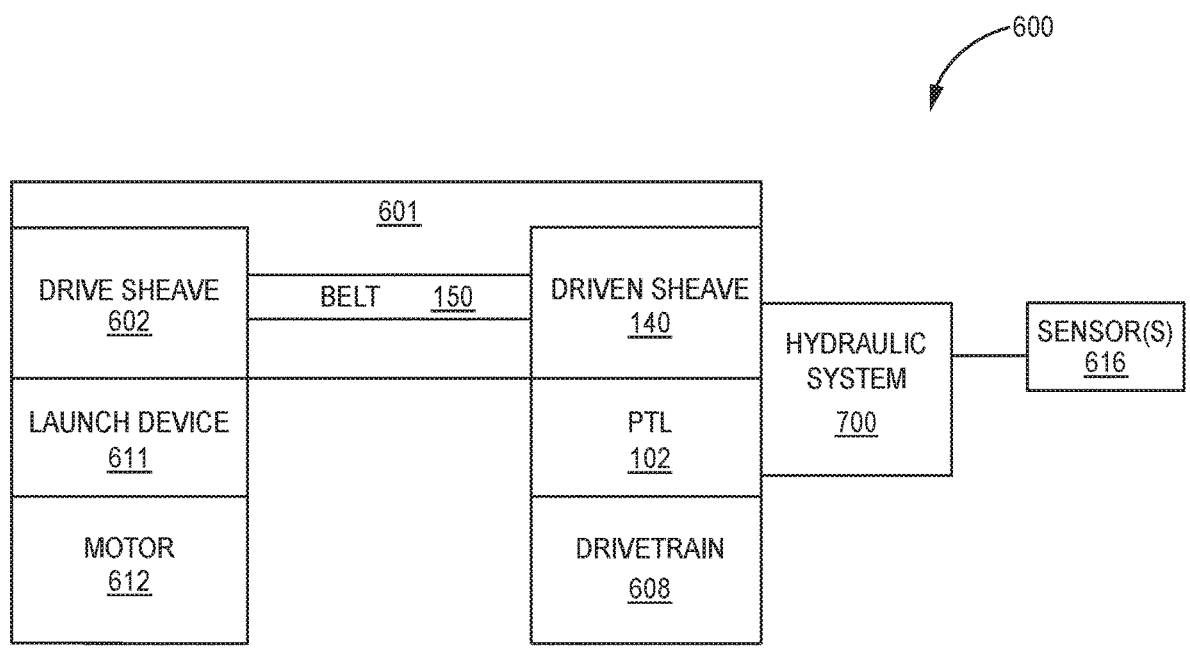
FIG. 6 illustrates a block diagram of a vehicle including a SBCVT with a variable torque limiting clutch according to one exemplary embodiment.

FIG. 6 illustrates a block diagram of a vehicle 600 including a SBCVT 601 of an embodiment. The SBCVT 601 includes a drive sheave 602 that is in rotational communication with the driven sheave 140 via belt 150. The belt 150 in one embodiment is a steel belt. The drive sheave 602 is operationally coupled to a motor 612. In one embodiment, a launch device 611 is positioned between the motor 412 and the drive sheave 602. The launch device 611 may be a torque converter or a clutch. The launch device 611 may be necessary with a SBCVT since the SBCVT 601 always operates in a 'tight belt' configuration, meaning that a finite gear ratio is always maintained. Large slip events that could occur on launch are not acceptable between the belt 150 and the sheaves members of the respective drive and driven sheaves 602 and 140, so an external launch coupling device such as launch device 611 may be used in some embodiments.

The driven sheave 140 is further operationally coupled to the VTL clutch 102 that is in turn operationally coupled to a drivetrain 608 to selectively transfer torque between the driven sheave 140 and the drivetrain 608. The drivetrain 608 may include further gearing, drive shafts, half shafts, differentials, wheels, etc. Further as discussed above, a single hydraulic system 700 provides hydraulic pressure to selectively manipulate the movable sheave member 144 of the driven sheave 140 and a clutch pack 108 of the VTL clutch 102 as discussed above. The hydraulic system 700 selectively manipulates the movable sheave member 144 of the driven sheave 140 and the clutch pack 108 of the VTL clutch 102 with one or more sensor signals from one or more sensors 616 in an embodiment. The sensors may include an angular velocity sensor, a throttle position sensor, a torque sensor, steering sensor, etc.

Figure 7:
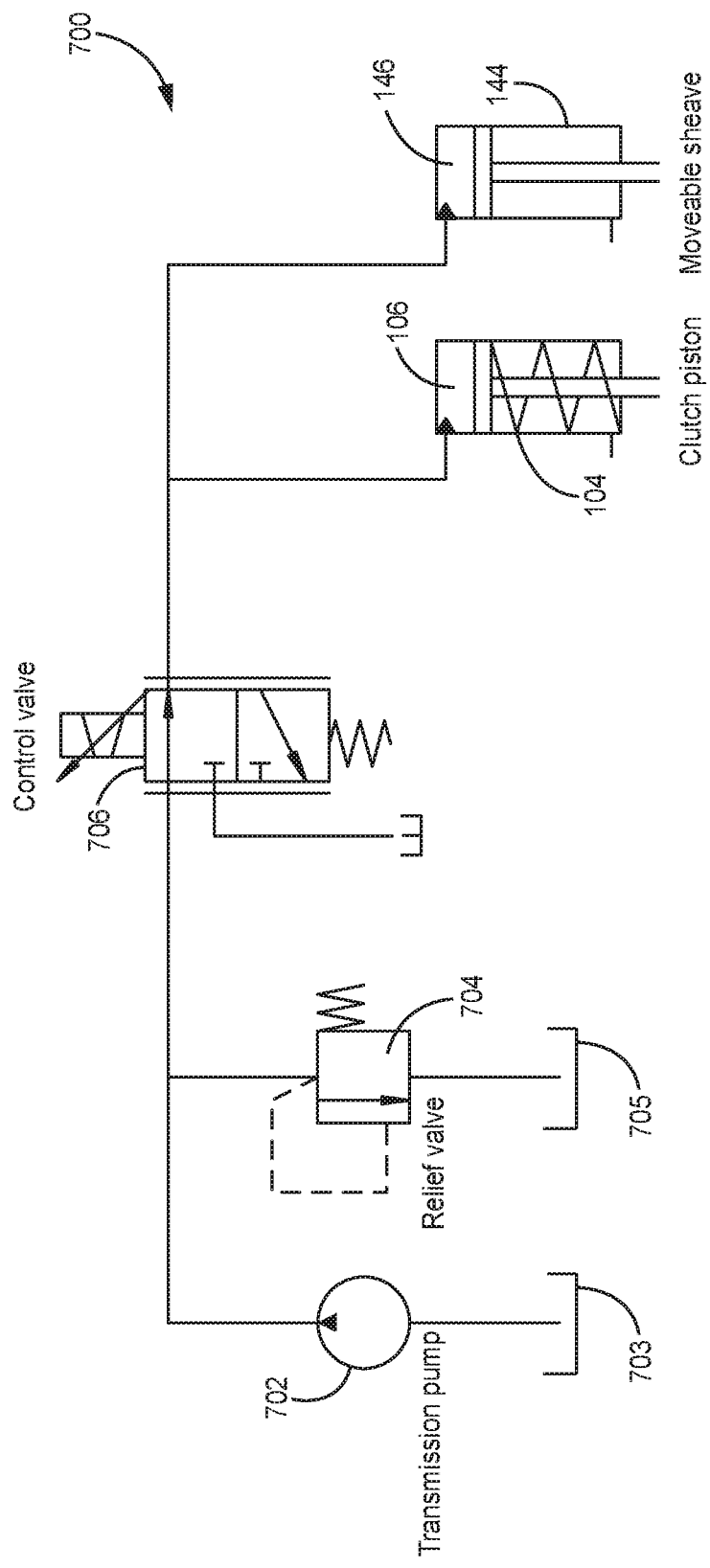
FIG. 7 illustrates schematic diagram of a hydraulic system used to move a variable torque limiting clutch piston and the movable sheave according to one exemplary embodiment.

An example of a hydraulic system 700 used to move the clutch piston 104 and the movable sheave member 144 is illustrated in FIG. 7. As illustrated, the hydraulic system 700 includes a transmission pump 702 that pumps a fluid from a main reservoir 703 and a relief valve 704 that is in fluid with a relief reservoir 705. A control valve 706 is used to control the fluid pressure to the clutch hydraulic chamber 106 to move the clutch piston 104 and the hydraulic chamber 103 to move the movable sheave 144.

Figure 8:
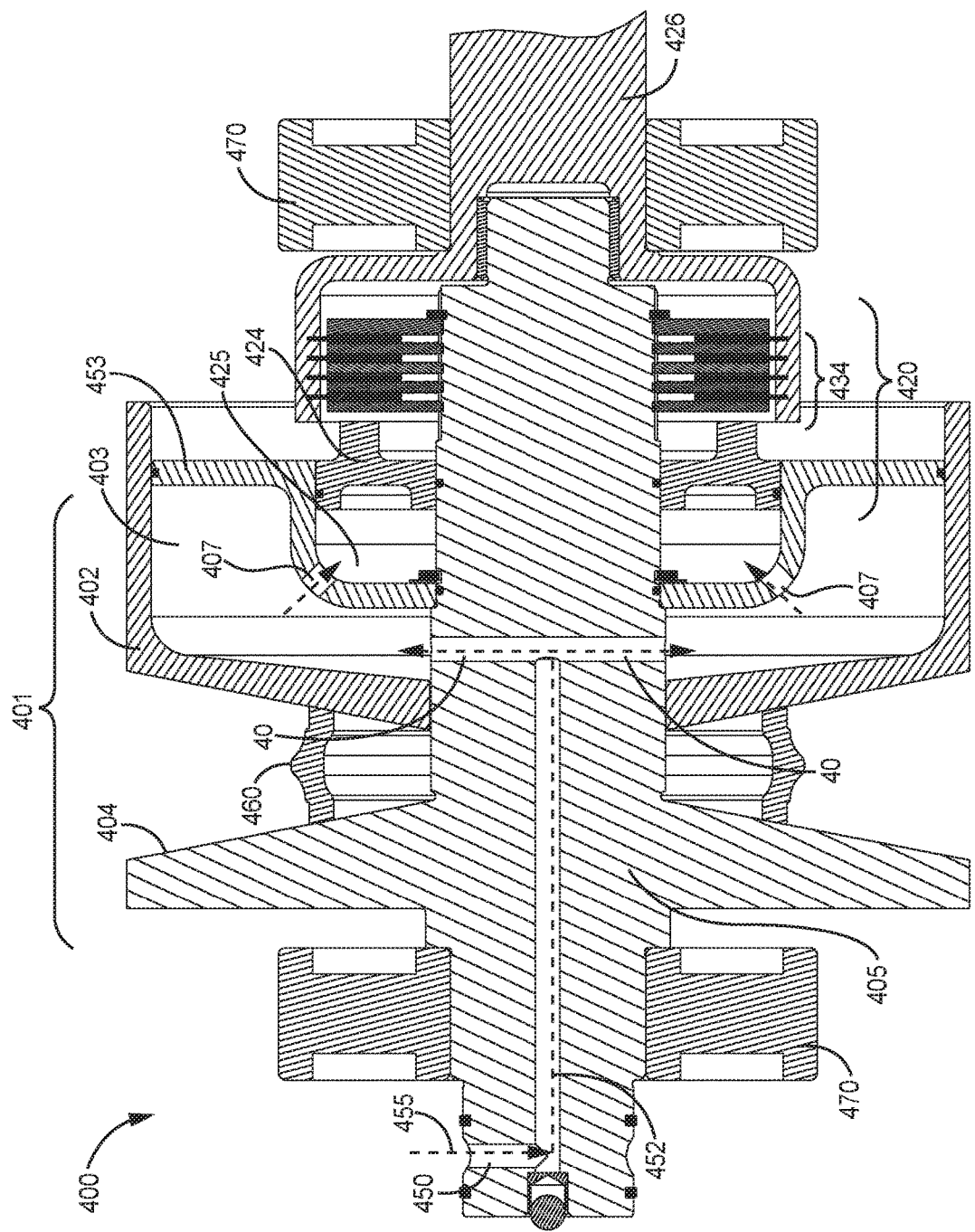
FIG. 8 illustrates a cross-sectional side view of another driven sheave and variable torque limiting clutch assembly for a SBCVT according to one exemplary embodiment.

FIG. 8 illustrates yet another example of a driven sheave and variable torque limiting clutch assembly 400 of a CVT embodiment with an integrated hydraulic system that is used to activate both a driven sheave 401 and VTL clutch 420. As in the other embodiments, the driven sheave 401 includes a fixed sheave member 404 and a movable sheave member 402. The fixed sheave member 404 includes (or is mounted on in an embodiment) a driven clutch post 405. The movable sheave member 402 is slidably mounted on the driven clutch post 405 and is activated by the integrated hydraulic system. The integrated hydraulic system includes a driven sheave post passage 452. Further a pressure path 450 provides a path from a hydraulic pump (such as pump 702 of FIG. 7) to the driven sheave post passage 452. Pressure 455 from the pump 702 is passed to a movable sheave chamber 403 via movable sheave passages 409. Further, in this example embodiment, the pressure is further passed on to a VTL clutch chamber 425 (which is part of the VTL activation assembly of the VTL clutch 420) via stator passages 407 through a sheave stator 453 that forms in part the movable sheave chamber 403. The stator passages 407 are configured to provide a path that equalizes hydraulic pressure between the VTL clutch chamber 403 of the VTL clutch 420 and the movable sheave chamber 403 of the driven sheave 401 such that the VTL clutch 420 and driven sheave 401 may be activated by a same hydraulic signal used to control the hydraulic system (such as the hydraulic system 700 illustrated in FIG. 7).

A piston 424 of the VTL activation assembly applies axial force on a clutch pack 434 of the VTL clutch 420 based on the hydraulic pressure on the piston to selectively couple rotation of the driven sheave 401 with an input member 426. The input member 426 is in rotational communication with a motor (such as motor 512 of FIG. 8). As with the embodiment discussed above, the hydraulic system in this embodiment is also shared between the driven sheave 401 and the VTL clutch 420. Also illustrated in FIG. 6 is a steel belt 460. Steel belt 460 couples torque between the driven sheave 401 and a drive sheave (such as drive sheave 602 of FIG. 6). Bearings 470 and 470 are used to mount the driven sheave and variable torque limiting clutch 400.

Example Embodiments

Example 1 includes a driven sheave and variable torque limiting clutch assembly for a CVT including a driven sheave, a VTL clutch and a hydraulic system. The driven sheave is operationally coupled to a drive sheave via belt of the CVT. The driven sheave includes a fixed sheave member and a movable sheave member. The driven sheave is operationally coupled to a drivetrain. The VTL clutch is coupled between the driven sheave and the drivetrain to selectively couple torque between the driven sheave and the drivetrain. The hydraulic system is configured to manipulate both the movable sheave member of the driven sheave and the VTL clutch with shared hydraulic pressure.

Example 2 includes the driven sheave and variable torque limiting clutch assembly for a CVT of Example 1, wherein the belt is a steel belt.

Example 3 includes the driven sheave and variable torque limiting clutch assembly for a CVT of any of the Examples 1-2, wherein the hydraulic system manipulates both the movable sheave and the VTL clutch based on at least one sensor input signal.

Example 4 includes the driven sheave and variable torque limiting clutch assembly for a CVT of Example 3, wherein the at least one sensor input signal is an input signal from at least one of an angular velocity sensor, a throttle position sensor, a torque sensor and a steering sensor.

Example 5 includes the driven sheave and variable torque limiting clutch assembly for a CVT of any of the Examples 1-4, further including a driven post and a VTL clutch shaft. The driven post having at least one driven post hydraulic passage for the shared hydraulic pressure. The movable sheave member of the driven sheave is slidably mounted on and rotationally fixed to the driven post. The VTL clutch shaft has at least one VTL clutch shaft hydraulic passage for the shared hydraulic pressure. The VTL clutch shaft is coupled to the driven post wherein at least one of the at least one VTL clutch shaft hydraulic passage is aligned with at least one of the at least one driven post hydraulic passage.

Example 6 includes the driven sheave and variable torque limiting clutch assembly for a CVT of Example 5, wherein the VTL clutch further includes a clutch pack and clutch piston. The clutch piston is configured to engage the clutch pack based on the shared hydraulic pressure.

Example 7 includes the driven sheave and variable torque limiting clutch assembly for a CVT of Example 6, further wherein the clutch pack further includes a clutch basket, a clutch hub and first and second sets of clutch plates. The clutch basket is coupled to the VTL clutch shaft. The clutch hub is coupled to an output shaft. The first set of clutch plates are coupled to the clutch basket. The second set of clutch plates are alternatively positioned between the first set of clutch plates. The second set of clutch plates are coupled to the clutch hub. The clutch piston is configured to compress the alternatively positioned first and second sets of clutch plates into each other based on the shared hydraulic pressure provided by at least one of the at least one VTL clutch shaft hydraulic passage through the VTL clutch shaft.

Example 8 includes the driven sheave and variable torque limiting clutch assembly for a CVT of Example 7, further wherein an inside surface of the clutch basket and a backside surface of the clutch piston form a clutch hydraulic chamber. The at least one passage through the VTL clutch shaft extends into the clutch hydraulic chamber.

Example 9 includes the driven sheave and variable torque limiting clutch assembly for a CVT of Example 7, further including a clutch biasing member that is positioned to exert a select bias force on the clutch piston away from the clutch plates.

Example 10 includes the driven sheave and variable torque limiting clutch assembly for a CVT of Example 9, further including a clutch stator that is statically positioned in on the VTL clutch shaft. The clutch biasing member is positioned between the clutch stator and the clutch piston.

Example 11 includes the driven sheave and variable torque limiting clutch assembly for a CVT of Example 5, wherein the at least one VTL clutch shaft hydraulic passage through the VTL clutch shaft includes at least one VTL clutch shaft hydraulic passage aligned with the driven post hydraulic passage of the driven post and at least one VTL clutch shaft hydraulic passage through the VTL clutch shaft to activate the VTL clutch.

Example 12 includes the driven sheave and variable torque limiting clutch assembly for a CVT of Example 5, further wherein the driven sheave further includes a sheave stator that is statically positioned on the driven post. The sheave stator and an inside surface of the moveable sheave member form a movable sheave chamber. The at least one driven post hydraulic passage of the driven post extends into the movable sheave chamber.

Example 13 includes the driven sheave and variable torque limiting clutch assembly for a CVT of Example 12, further including a driven bias member configured to exert a select bias force on the movable sheave member away from the fixed sheave member.

Example 14 includes the driven sheave and variable torque limiting clutch assembly for a CVT of any of the Examples 1-13, wherein the VTL clutch is configured to transmits less torque than a belt to sheave interface at the driven sheave across all CVT ratios and driving torque pressure levels.

Example 15 includes a driven sheave and variable torque limiting clutch assembly for a CVT that includes a driven sheave, a VTL clutch and a hydraulic system. The driven sheave is configured to be operationally coupled to a drive sheave via belt. The driven sheave includes a fixed sheave member and a movable sheave member. The driven sheave is operationally coupled to a drivetrain. The VTL clutch is coupled between the driven sheave and a drivetrain to selectively couple torque between the driven sheave and the drivetrain. The hydraulic system is configured to manipulate both the movable sheave member of the driven sheave and the VTL clutch. Further wherein one of the driven sheave and the VTL clutch includes at least one hydraulic passage that is in communication with at least one other hydraulic passage in the other one of the driven sheave and the VTL clutch.

Example 16 includes the driven sheave and variable torque limiting clutch assembly for a CVT of Example 15, wherein the hydraulic system manipulates both the movable sheave and the VTL clutch based on sensor input from at least one of an angular velocity sensor, a throttle position sensor, a torque sensor and a steering sensor.

Example 17 includes the CVT with a variable torque limiting clutch of any of the Examples 15-16, wherein the VTL clutch is configured to transmits less torque than a belt to sheave interface at the drive and driven sheaves across all CVT ratios and driving torque pressure levels.

Example 18 includes the driven sheave and variable torque limiting clutch assembly for a CVT of any of the Examples 15-17, further wherein the driven sheave member includes a driven post that has at least one driven post hydraulic passage for the shared hydraulic pressure. The movable sheave member of the driven sheave being slidably mounted on and rotationally fixed to the driven post. The VTL clutch including a VTL clutch shaft that has at least one VTL clutch shaft hydraulic passage for the shared hydraulic pressure. The VTL clutch shaft being coupled the driven post wherein at least one of the at least one VTL clutch shaft hydraulic passage is aligned with at least one of the at least one driven post hydraulic passage.

Example 19 includes a vehicle including a variable torque limiting clutch for a CVT. The vehicle includes a motor, a drivetrain, at least one sensor, a VTL clutch and a hydraulic system. The motor is configured to generate engine torque. The at least one sensor is used to generate sensor signals based on at least one operational perimeter of the vehicle. The CVT includes a drive sheave and a driven sheave. The drive sheave is operationally coupled to the motor. The drive sheave is further operationally coupled to the driven sheave by a belt. The driven sheave includes a fixed sheave member and a movable sheave member. The VTL clutch is coupled between the driven sheave and the drivetrain to selectively couple and uncouple torque between the driven sheave and the drivetrain. The hydraulic system is configured to manipulate both the movable sheave member of the driven sheave and the VTL clutch with shared hydraulic pressure.

Example 20 includes the vehicle of Example 19 further including a launch device operationally coupled between the motor and the drive sheave of the CVT. The launch device configured to reduce slip events between the belt and the drive sheave of the CVT during a launch of the vehicle.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the present invention. Therefore, it is manifestly intended that this invention be limited only by the claims and the equivalents thereof.

The invention claimed is:

1. A driven sheave and variable torque limiting clutch assembly for a continuously variable transmission (CVT) comprising:
 a driven sheave operationally coupled to a drive sheave via a belt of the CVT, the driven sheave including a fixed sheave member and a movable sheave member, the driven sheave operationally coupled to a drivetrain;
 a variable torque limiting (VTL) clutch coupled between the driven sheave and the drivetrain to selectively couple torque between the driven sheave and the drivetrain; and
 a hydraulic system configured to manipulate both the movable sheave member of the driven sheave and the VTL clutch with different hydraulic pressure routing passages;
 a driven post having at least one driven post hydraulic passage, the movable sheave member of the driven sheave slidably mounted on and rotationally fixed to the driven post; and
 the driven sheave further includes a sheave stator that is statically positioned on the driven post, the sheave stator and an inside surface of the moveable sheave member forming a movable sheave chamber, the at least one driven post hydraulic passage of the driven post extending into the movable sheave chamber.

2. The driven sheave and variable torque limiting clutch assembly for a CVT of claim 1, wherein the belt is a steel belt.

3. The driven sheave and variable torque limiting clutch assembly for a CVT of claim 1, wherein the hydraulic system manipulates both the movable sheave and the VTL clutch based on at least one sensor input signal.

4. The driven sheave and variable torque limiting clutch assembly for a CVT of claim 3, wherein the at least one sensor input signal is an input signal from at least one of an angular velocity sensor, a throttle position sensor, a torque sensor and a steering sensor.

5. The driven sheave and variable torque limiting clutch assembly for a CVT of claim 1, further comprising:
 a VTL clutch shaft having at least one VTL shaft hydraulic passage, the VTL clutch shaft coupled to the driven post wherein at least one of the at least one VTL clutch shaft hydraulic passage is aligned with at least one of the at least one driven post hydraulic passage.

6. The driven sheave and variable torque limiting clutch assembly for a CVT of claim 5, wherein the VTL clutch further comprises:
 a clutch pack; and
 a clutch piston configured to engage the clutch pack based on hydraulic pressure.

7. The driven sheave and variable torque limiting clutch assembly for a CVT of claim 6, further wherein the clutch pack further comprises:
 a clutch basket coupled to the VTL clutch shaft;
 a clutch hub coupled to an output shaft;
 a first set of clutch plates coupled to the clutch basket; and
 a second set of clutch plates alternatively positioned between the first set of clutch plates, the second set of clutch plates coupled to the clutch hub, the clutch piston configured to compress the alternatively positioned first and second sets of clutch plates into each other based on the hydraulic pressure provided by at least one of the at least one VTL clutch shaft hydraulic passage through the VTL clutch shaft.

8. The driven sheave and variable torque limiting clutch assembly for a CVT of claim 7, further wherein:
 an inside surface of the clutch basket and a backside surface of the clutch piston forming a clutch hydraulic chamber, the at least one passage through the VTL clutch shaft extending into the clutch hydraulic chamber.

9. The driven sheave and variable torque limiting clutch assembly for a CVT of claim 7, further comprising:
 a clutch biasing member positioned to exert a select bias force on the clutch piston away from the clutch plates.

10. The driven sheave and variable torque limiting clutch assembly for a CVT of claim 9, further comprising:
 a clutch stator statically positioned on the VTL clutch shaft, the clutch biasing member positioned between the clutch stator and the clutch piston.

11. The driven sheave and variable torque limiting clutch assembly for a CVT of claim 5, wherein the at least one VTL clutch shaft hydraulic passage through the VTL clutch shaft includes at least one VTL clutch shaft hydraulic passage aligned with the driven post hydraulic passage of the driven post and at least one VTL clutch shaft hydraulic passage through the VTL clutch shaft to activate the VTL clutch.

12. The driven sheave and variable torque limiting clutch assembly for a CVT of claim 1, further comprising:
 a driven bias member configured to exert a select bias force on the movable sheave member away from the fixed sheave member.

13. The driven sheave and variable torque limiting clutch assembly for a CVT of claim 1, wherein the VTL clutch is configured to transmits less torque than a belt to sheave interface at the driven sheave across all CVT ratios and driving torque pressure levels.

14. A driven sheave and variable torque limiting clutch assembly for a CVT comprising:
 a driven sheave configured to be operationally coupled to a drive sheave via a belt, the driven sheave including a fixed sheave member and a movable sheave member the driven sheave operationally coupled to a drivetrain;

a variable torque limiting (VTL) clutch coupled between the driven sheave and the drivetrain to selectively couple torque between the driven sheave and the drivetrain; and a hydraulic system configured to manipulate both the movable sheave member of the driven sheave and the VTL clutch using different hydraulic pressure routing passages such that the movable sheave member of the driven sheave and the VTL clutch are not in hydraulic communication with each other;

a driven post having at least one driven post hydraulic passage, the movable sheave member of the driven sheave slidably mounted on and rotationally fixed to the driven post; and the driven sheave further includes a sheave stator that is statically positioned on the driven post, the sheave stator and an inside surface of the moveable sheave member forming a movable sheave chamber, the at least one driven post hydraulic passage of the driven post extending into the movable sheave chamber.

15. The driven sheave and variable torque limiting clutch assembly for a CVT of claim 14, wherein the hydraulic system manipulates both the movable sheave and the VTL clutch based on sensor input from at least one of an angular velocity sensor, a throttle position sensor, a torque sensor and a steering sensor.

16. The driven sheave and variable torque limiting clutch assembly for a CVT of claim 14, wherein the VTL clutch is configured to transmits less torque than a belt to sheave interface at the drive and driven sheaves across all CVT ratios and driving torque pressure levels.

17. The driven sheave and variable torque limiting clutch assembly for a CVT claim 14, further wherein:

the VTL clutch including a VTL clutch shaft that has at least one VTL clutch shaft hydraulic passage, the VTL clutch shaft being coupled to the driven post wherein at least one of the at least one VTL clutch shaft hydraulic passage is aligned with at least one of the at least one driven post hydraulic passage.

18. A vehicle including a variable torque limiting clutch for a continuously variable transmission (CVT), the vehicle comprising:

a motor configured to generate engine torque;

a drivetrain;

at least one sensor to generate sensor signals based on at least one operational perimeter of the vehicle;

the CVT including a drive sheave and a driven sheave, the drive sheave is operationally coupled to the motor, the drive sheave is further operationally coupled to the driven sheave by a belt, the driven sheave including a fixed sheave member and a movable sheave member;

a variable torque limiting (VTL) clutch coupled between the driven sheave and the drivetrain to selectively couple and uncouple torque between the driven sheave and the drivetrain; and a hydraulic system configured to manipulate both the movable sheave member of the driven sheave and the VTL clutch using different hydraulic pressure routing passages such that the movable sheave member of the driven sheave and the VTL clutch are not in hydraulic communication with each other;

a driven post having at least one driven post hydraulic passage, the movable sheave member of the driven sheave slidably mounted on and rotationally fixed to the driven post; and the driven sheave further includes a sheave stator that is statically positioned on the driven post, the sheave stator and an inside surface of the moveable sheave member forming a movable sheave chamber, the at least one driven post hydraulic passage of the driven post extending into the movable sheave chamber.

19. The vehicle of claim 18, further comprising:

a launch device operationally coupled between the motor and the drive sheave of the CVT, the launch device configured to reduce slip events between the belt and the drive sheave of the CVT during a launch of the vehicle.

* * * * *